(12) United States Patent
Fan (10) Patent No.: US 10,180,096 B2
(45) Date of Patent: Jan. 15, 2019

(54) FLUID DELIVERY SYSTEM WITH LINE PRESSURE CONTROL VALVE

(71) Applicant: TENNECO AUTOMOTIVE OPERATING COMPANY INC., Lake Forest, IL (US)

(72) Inventor: Gaofeng Fan, Shanghai (CN)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 48 days.

(21) Appl. No.: 15/316,956

(22) PCT Filed: Jun. 11, 2014

(86) PCT No.: PCT/CN2014/079662
§ 371 (c)(1),
(2) Date: Dec. 7, 2016

(87) PCT Pub. No.: WO2015/188329
PCT Pub. Date: Dec. 17, 2015

(65) Prior Publication Data
US 2017/0122172 A1 May 4, 2017

(51) Int. Cl.
*F01N 3/20* (2006.01)
*F01N 3/10* (2006.01)
(Continued)

(52) U.S. Cl.
CPC ........... *F01N 3/2066* (2013.01); *F01N 3/103* (2013.01); *F01N 9/00* (2013.01); *F01N 3/035* (2013.01);
(Continued)

(58) Field of Classification Search
CPC ........ F01N 3/023; F01N 3/025; F01N 3/0253; F01N 3/029; F01N 3/0293; F01N 3/2033;
(Continued)

(56) References Cited

U.S. PATENT DOCUMENTS 3,596,640 A   8/1971 Bloomfield
3,908,371 A * 9/1975 Nagai ................ B01D 53/9477
                                              60/301

(Continued)

FOREIGN PATENT DOCUMENTS

CN    101493027 A    7/2009
CN    101737133 A    6/2010
(Continued)

*Primary Examiner* — Mark Laurenzi
*Assistant Examiner* — Mickey France
(74) *Attorney, Agent, or Firm* — Harness, Dickey & Pierce, P.L.C.

(57) ABSTRACT

An exhaust treatment fluid delivery system (16, 22, 116) may include a supply passageway (46, 146), a supply manifold (38, 138), injectors (42, 142), a bypass passageway (50, 150) and first and second pressure sensors (34, 134, 40, 140). The supply passageway (46, 146) receives the exhaust treatment fluid from a tank (26, 126) and provides the exhaust treatment fluid to the supply manifold (38, 138). The bypass passageway (50, 150) connects the supply passageway (46, 146) with the return passageway (48, 148) and includes a bypass valve (36, 136) controlling fluid flow therebetween. The first pressure sensor (34, 134) measures a first pressure of exhaust treatment fluid in the supply passageway (46, 146) based upon which the bypass valve (36, 136) is controlled. The second pressure sensor (40, 140) measures a second pressure of exhaust treatment fluid in the supply manifold (38, 138) based upon which the injectors (42, 142) are controlled.

20 Claims, 2 Drawing Sheets

(51) Int. Cl.
*F01N 9/00* (2006.01)
*F01N 3/035* (2006.01)

(52) U.S. Cl.
CPC ...... *F01N 2550/05* (2013.01); *F01N 2610/02* (2013.01); *F01N 2610/03* (2013.01); *F01N 2610/14* (2013.01); *F01N 2610/1406* (2013.01); *F01N 2610/146* (2013.01); *F01N 2610/148* (2013.01); *F01N 2610/1473* (2013.01); *Y02T 10/24* (2013.01)

(58) Field of Classification Search
CPC ...... F01N 3/206; F01N 3/2066; F01N 3/2073; F01N 3/208; F01N 2610/02; F01N 2610/03; F01N 2610/10; F01N 2610/11; F01N 2610/14; F01N 2610/1406; F01N 2610/1433; F01N 2610/144; F01N 2610/1453; F01N 2610/146; F01N 2610/1466; F01N 2610/1473; F01N 2610/1493
USPC ......... 60/272, 273, 274, 282, 286, 287–293, 60/295, 296, 298, 300, 301, 303
See application file for complete search history.

(56) References Cited

U.S. PATENT DOCUMENTS

| | | | |
|---|---|---|---|
| 5,522,218 A * | 6/1996 | Lane | B01D 53/9495 60/274 |
| 5,976,475 A | 11/1999 | Peter-Hoblyn et al. | |
| 6,006,515 A * | 12/1999 | Wakamoto | B01D 53/9431 60/274 |
| 6,125,629 A | 10/2000 | Patchett | |
| 6,182,444 B1 * | 2/2001 | Fulton | B01D 53/9495 60/277 |
| 6,293,097 B1 * | 9/2001 | Wu | B01D 53/9431 60/286 |
| 6,820,417 B2 | 11/2004 | May et al. | |
| 6,877,312 B2 | 4/2005 | Nakatani et al. | |
| 7,021,048 B2 * | 4/2006 | Taylor, III | B01D 53/9431 422/169 |
| 7,040,290 B2 | 5/2006 | Kim | |
| 8,109,077 B2 | 2/2012 | Reba et al. | |
| 8,122,709 B2 | 2/2012 | Buerglin et al. | |
| 8,171,722 B2 | 5/2012 | Rodman et al. | |
| 8,381,514 B2 | 2/2013 | Salanta et al. | |
| 8,397,491 B2 | 3/2013 | Bauer et al. | |
| 8,402,750 B2 * | 3/2013 | Floyd | F01N 3/2066 60/286 |
| 8,863,501 B2 | 10/2014 | Reusing et al. | |
| 8,904,760 B2 | 12/2014 | Mital | |
| 8,920,757 B1 * | 12/2014 | Chandrapati | B01D 53/9495 422/105 |
| 8,938,949 B2 | 1/2015 | Branco et al. | |
| 8,943,808 B2 | 2/2015 | Li et al. | |
| 9,080,487 B2 | 7/2015 | Golin et al. | |
| 9,169,760 B2 | 10/2015 | Maguin et al. | |
| 9,222,388 B2 | 12/2015 | Kregling et al. | |
| 2004/0098978 A1 * | 5/2004 | Tarabulski | F01N 3/208 60/286 |
| 2004/0118109 A1 * | 6/2004 | Gladden | F01N 3/206 60/286 |
| 2005/0069476 A1 * | 3/2005 | Blakeman | B01D 53/9431 423/239.1 |
| 2006/0196169 A1 * | 9/2006 | Ripper | F01N 3/021 60/286 |
| 2007/0215209 A1 | 9/2007 | Street et al. | |
| 2008/0028751 A1 * | 2/2008 | Stroia | F01N 3/0253 60/286 |
| 2008/0087008 A1 * | 4/2008 | Reba | F01N 3/0253 60/301 |
| 2008/0092531 A1 * | 4/2008 | Suzuki | F01N 3/0821 60/301 |
| 2008/0282680 A1 * | 11/2008 | Tachy | F01N 3/0253 60/286 |
| 2009/0025373 A1 * | 1/2009 | Buerglin | B01D 53/90 60/287 |
| 2009/0035195 A1 * | 2/2009 | Robel | F01N 3/0231 422/177 |
| 2009/0145400 A1 | 6/2009 | Hanneke et al. | |
| 2009/0205316 A1 | 8/2009 | Dougnier et al. | |
| 2009/0223486 A1 | 9/2009 | Weizenauer et al. | |
| 2010/0139260 A1 | 6/2010 | Rodman et al. | |
| 2010/0319320 A1 * | 12/2010 | Mital | F01N 3/035 60/285 |
| 2010/0319324 A1 | 12/2010 | Mital | |
| 2011/0000196 A1 * | 1/2011 | Kasahara | F01N 3/2066 60/286 |
| 2011/0047973 A1 * | 3/2011 | Wilhelm | F01N 3/0253 60/274 |
| 2011/0146249 A1 | 6/2011 | Palluat de Besset et al. | |
| 2011/0154806 A1 * | 6/2011 | Hoyte | F01N 3/208 60/276 |
| 2011/0162347 A1 * | 7/2011 | Katare | F01N 3/10 60/274 |
| 2011/0197569 A1 | 8/2011 | Salanta et al. | |
| 2011/0203261 A1 | 8/2011 | Kotrba et al. | |
| 2012/0036842 A1 * | 2/2012 | Nakamura | F01N 3/2066 60/287 |
| 2012/0039779 A1 * | 2/2012 | Maus | F01N 3/208 423/212 |
| 2012/0131910 A1 | 5/2012 | Reusing et al. | |
| 2012/0260629 A1 * | 10/2012 | Levin | F01N 3/208 60/274 |
| 2013/0031890 A1 * | 2/2013 | Shovels | F01N 3/208 60/274 |
| 2013/0067892 A1 | 3/2013 | Minezawa et al. | |
| 2013/0118155 A1 * | 5/2013 | Domon | F01N 3/10 60/274 |
| 2013/0140383 A1 * | 6/2013 | Thomas | F01N 3/208 239/585.5 |
| 2013/0171050 A1 * | 7/2013 | Adelman | B01D 53/90 423/212 |
| 2013/0232958 A1 * | 9/2013 | Ancimer | F01N 3/208 60/301 |
| 2013/0299604 A1 | 11/2013 | Thomas et al. | |
| 2013/0343959 A1 | 12/2013 | Golin et al. | |
| 2014/0047821 A1 * | 2/2014 | Kawada | F01N 3/2066 60/299 |
| 2014/0053539 A1 * | 2/2014 | Golin | F01N 3/021 60/301 |
| 2014/0116027 A1 * | 5/2014 | Ancimer | F01N 3/2053 60/274 |
| 2014/0116545 A1 | 5/2014 | Gottwald | |
| 2014/0238504 A1 | 8/2014 | Kregling et al. | |
| 2014/0245722 A1 * | 9/2014 | Naik | F01N 3/2006 60/286 |
| 2014/0360168 A1 * | 12/2014 | Broderick | F01N 3/208 60/274 |
| 2014/0363358 A1 * | 12/2014 | Udd | F01N 3/106 423/212 |
| 2015/0047327 A1 * | 2/2015 | Overhoff | F01N 3/208 60/274 |
| 2015/0052878 A1 * | 2/2015 | Qi | F01N 3/2066 60/277 |
| 2015/0096287 A1 * | 4/2015 | Qi | F01N 3/208 60/286 |
| 2015/0167526 A1 * | 6/2015 | Henry | F01N 3/103 60/274 |
| 2015/0196878 A1 * | 7/2015 | Nunez | F01N 3/021 423/212 |
| 2015/0204226 A1 * | 7/2015 | Moore | F01N 3/208 60/274 |
| 2015/0224447 A1 * | 8/2015 | Nishizawa | F01N 13/009 423/212 |
| 2015/0252707 A1 * | 9/2015 | Nishizawa | F01N 3/208 60/274 |
| 2015/0275730 A1 * | 10/2015 | Gupta | F01N 3/208 60/274 |

(56) References Cited

U.S. PATENT DOCUMENTS

| | | | |
|---|---|---|---|
| 2015/0336052 A1* | 11/2015 | Hogan | B01D 53/94 422/119 |
| 2016/0040575 A1* | 2/2016 | Zhang | F01N 3/208 60/274 |
| 2016/0047285 A1* | 2/2016 | Alcini | F01N 3/2053 60/301 |
| 2016/0160725 A1 | 6/2016 | Hudgens et al. | |
| 2016/0230720 A1 | 8/2016 | Hackett et al. | |
| 2017/0082003 A1* | 3/2017 | Nilsson | F01N 3/208 |
| 2017/0218811 A1* | 8/2017 | Nilsson | F01N 3/208 |
| 2017/0218812 A1* | 8/2017 | Nilsson | F01N 3/208 |
| 2017/0218813 A1* | 8/2017 | Nilsson | F01N 3/208 |

FOREIGN PATENT DOCUMENTS

| | | | |
|---|---|---|---|
| CN | 101892888 A | 11/2010 | |
| CN | 102713179 A | 10/2012 | |
| CN | 102906385 A | 1/2013 | |
| CN | 103348106 A | 10/2013 | |
| CN | 104074740 A | 10/2014 | |
| CN | 104110293 A | 10/2014 | |
| CN | 104428503 A | 3/2015 | |
| CN | 204267135 U | 4/2015 | |
| CN | 204267138 U | 4/2015 | |
| CN | 204312169 U | 5/2015 | |
| CN | 104763497 A | 7/2015 | |
| CN | 105026714 A | 11/2015 | |
| DE | 10349143 A1 | 5/2005 | |
| DE | 102006007554 A1 | 8/2007 | |
| DE | 102010029340 | * 12/2011 | F01N 3/208 |
| DE | 102012005486 A1 | 9/2013 | |
| EP | 1752632 A1 | 2/2007 | |
| JP | 2006170013 A | * 6/2006 | |
| JP | 2007327377 A | * 12/2007 | |
| JP | 2014020310 A | * 2/2014 | |
| WO | 2013123865 A1 | 8/2013 | |

* cited by examiner

FLUID DELIVERY SYSTEM WITH LINE PRESSURE CONTROL VALVE

CROSS-REFERENCE TO RELATED APPLICATIONS

This application is a 371 U.S. National Stage of International Application No. PCT/CN2014/079662, filed on Jun. 11, 2014. The entire disclosure of the above application is incorporated herein by reference.

FIELD

The present disclosure relates to an exhaust aftertreatment system for a combustion engine.

BACKGROUND

This section provides background information related to the present disclosure and is not necessarily prior art.

Emission regulation requirements are mandating that engines have exhaust aftertreatment systems to eliminate, or at least substantially minimize, the emission of, for example, particulate matter and $NO_X$. To eliminate or reduce the emission of particulate matter and $NO_X$, exhaust aftertreatment systems can include components such as a particulate filter (e.g., a diesel particulate filter (DPF)), a selective catalyst reduction (SCR) component, and a diesel oxidation catalyst (DOC) component.

SCR and DOC components generally work in conjunction with fluid delivery systems that inject a fluid (e.g., a hydrocarbon fluid, urea or other reagent) into the exhaust stream to treat the exhaust before the exhaust enters the SCR or DOC components. In the case of SCR, a reductant solution including urea, for example, may injected into the exhaust stream before entry into the SCR component. In the case of DOC, a hydrocarbon reductant such as diesel fuel is injected into the exhaust stream before entry into the DOC component.

The fluid delivery systems involve the integration of injectors, pumps, filters, valves, and other necessary control devices to control the dosing of each of these fluids into the exhaust stream. In general, fluid delivery systems for light, medium, and heavy-duty trucks, for example, may include a single injection source for dosing the fluid into the exhaust stream. Fluid delivery systems for large-scale engines for locomotive, marine, and stationary applications may include multiple injection sources for injecting the fluid into the exhaust stream. These large-scale applications, therefore, can be difficult to design to overcome various issues such as maintaining proper injector pressure, system durability, sufficient reductions of harmful emission (e.g., particulate matter and $NO_X$), cost, and maintenance. The principles of the present disclosure provide for more precise control of fluid pressure at the injectors so that the spray droplet size of the fluid can be more precisely regulated within a tighter tolerance.

SUMMARY

This section provides a general summary of the disclosure, and is not a comprehensive disclosure of its full scope or all of its features.

In one form, the present disclosure provides an exhaust aftertreatment system for treating exhaust gas discharged from a combustion engine. The exhaust aftertreatment system may include a catalyst component, an exhaust treatment fluid delivery system for injecting an exhaust treatment fluid into an exhaust stream at a location upstream of the catalyst component. The exhaust treatment fluid delivery system may include a tank for holding the exhaust treatment fluid, a supply passageway, one or more injectors (e.g., 1-10 injectors or more), a bypass valve, and a control module. The supply passageway receives the exhaust treatment fluid from the tank and provides the exhaust treatment fluid to a supply manifold. The plurality of injectors receive the exhaust treatment fluid from the supply manifold and dose the exhaust treatment fluid into the exhaust stream. The bypass valve selectively allows a portion of the exhaust treatment fluid in the supply passageway to return to the tank via a bypass passageway without flowing through the injectors. The control module controls the bypass valve and the injectors based on a first fluid pressure in the supply passageway and a second fluid pressure between an inlet of the supply manifold and the injectors.

In some embodiments, the control module controls the bypass valve to achieve a predetermined fluid pressure in the supply passageway that is a higher than a target fluid pressure at the injectors.

In some embodiments, the control module controls the bypass valve and injectors to account for pressure head due to differences in vertical height among the injectors and one or more pumps of the fluid delivery system.

In some embodiments, the aftertreatment system includes return passageway that returns un-injected exhaust treatment fluid from the injectors to the tank and allows for cooling of the injectors.

In some embodiments, the exhaust treatment fluid delivery system includes a return valve disposed along the return passageway between a return manifold and the bypass passageway.

In some embodiments, the control module controls the return valve based on a third fluid pressure in the return passageway.

In some embodiments, the bypass valve and the return valve are pulse-width-modulated.

In some embodiments, the exhaust treatment fluid delivery system includes a valve-bypass line allowing fluid to bypass the return valve.

In some embodiments, the valve-bypass line includes a check valve that allows fluid flow through the valve-bypass line in a first direction from a first location between the return valve and the tank and a second location between the return valve and the return manifold and prevents fluid flow through the valve-bypass line in a second direction opposite the first direction.

In some embodiments, the exhaust treatment fluid delivery system includes a pump for pressurizing the supply manifold and inlet lines of the injectors.

In some embodiments, the exhaust treatment fluid is a hydrocarbon exhaust treatment fluid. The hydrocarbon exhaust treatment fluid may be dispersed at a location adjacent the catalyst component.

In some embodiments, the catalyst component is an oxidation catalyst component.

In some embodiments, the exhaust treatment fluid is a urea exhaust treatment fluid. The urea exhaust treatment fluid may be dispersed at a location adjacent the catalyst component.

In some embodiments, the catalyst component is a selective-catalytic-reduction catalyst.

In some embodiments, the exhaust aftertreatment system includes a urea quality sensor disposed upstream of at least one of the injectors.

In some embodiments, the plurality of injectors inject the exhaust treatment fluid into a common exhaust stream.

In some embodiments, the plurality of injectors inject the exhaust treatment fluid into separate exhaust streams corresponding to multiple combustion engines.

In another form, the present disclosure provides a fluid delivery system for injecting exhaust treatment fluid into a stream of exhaust gas discharged by a combustion engine. The fluid delivery system may include a tank for containing the exhaust treatment fluid, a supply passageway, a supply manifold, a one or more injectors, a return passageway, a bypass passageway, and first and second pressure sensors. The supply passageway receives the exhaust treatment fluid from the tank. The supply manifold receives the exhaust treatment fluid from the supply passageway. The plurality of injectors receive the exhaust treatment fluid from the supply manifold. The exhaust treatment fluid is returned from the injectors to the tank through the return passageway. The bypass passageway connects the supply passageway with the return passageway and may include a bypass valve controlling fluid flow therebetween. The first pressure sensor may measure a first pressure of exhaust treatment fluid in the supply passageway. The bypass valve is controlled based on the first pressure. The second pressure sensor may measure a second pressure of exhaust treatment fluid in the supply manifold. The injectors may be controlled based on the second pressure.

In some embodiments, the bypass valve is controlled to achieve a predetermined fluid pressure in the supply passageway that is a higher than a target fluid pressure at the injectors.

In some embodiments, the fluid delivery system includes a return valve disposed along the return passageway between a return manifold and the bypass passageway.

In some embodiments, the return valve is controlled based on a third pressure in the return passageway.

In some embodiments, the bypass valve and the return valve are pulse-width-modulated.

In some embodiments, the fluid delivery system includes a valve-bypass line allowing fluid to bypass the return valve.

In some embodiments, the valve-bypass line includes a check valve that allows fluid flow through the valve-bypass line in a first direction from a first location between the return valve and the tank and a second location between the return valve and the return manifold. The check valve prevents fluid flow through the valve-bypass line in a second direction opposite the first direction.

In some embodiments, the fluid delivery system includes a pump for pressurizing the supply manifold and inlet lines of the injectors.

In some embodiments, the exhaust treatment fluid is a hydrocarbon exhaust treatment fluid. The hydrocarbon exhaust treatment fluid may be injected into an exhaust stream at a location adjacent a catalyst component.

In some embodiments, the catalyst component is an oxidation catalyst component.

In some embodiments, the exhaust treatment fluid is a urea exhaust treatment fluid. The urea exhaust treatment fluid may be injected at a location adjacent a catalyst component.

In some embodiments, the catalyst component is a selective-catalytic-reduction catalyst.

In some embodiments, the injectors inject the exhaust treatment fluid into a common exhaust stream.

In some embodiments, the injectors inject the exhaust treatment fluid into separate exhaust streams corresponding to multiple combustion engines.

In another form, the present disclosure provides a method that may include supplying exhaust treatment fluid from a tank to a supply manifold; controlling an injector that receives the exhaust treatment fluid from the supply manifold based on a first fluid pressure in the supply manifold; selectively allowing a portion of the exhaust treatment fluid to bypass the injector; and controlling an amount of the exhaust treatment fluid that is allowed to bypass the injector based on a second fluid pressure upstream of the supply manifold.

In some embodiments, the method includes measuring the second fluid pressure with a pressure sensor disposed along a supply passageway providing the exhaust treatment fluid from the tank to the supply manifold.

In some embodiments, controlling the injector includes adjusting a pulse-width-modulation duty cycle of the injector.

In some embodiments, controlling the amount of the exhaust treatment fluid that is allowed to bypass the injector includes adjusting a pulse-width-modulation duty cycle of a bypass valve.

In some embodiments, the method includes controlling a backpressure of fluid at the injector with a return valve disposed in a return passageway through which exhaust treatment fluid is returned from the injector to the tank.

In some embodiments, controlling the backpressure of fluid at the injector with the return valve includes controlling the return valve based on a third fluid pressure in the return passageway.

In some embodiments, the method includes selectively allowing exhaust treatment fluid to bypass the return valve.

In some embodiments, the method includes detecting fluid leaks by pumping fluid through the return passageway toward a return manifold.

In some embodiments, controlling the return valve includes adjusting a pulse-width-modulation duty cycle of the return valve.

In some embodiments, supplying exhaust treatment fluid includes supplying a hydrocarbon exhaust treatment fluid.

In some embodiments, the method includes injecting the hydrocarbon exhaust treatment fluid into an exhaust stream adjacent an oxidation catalyst.

In some embodiments, supplying exhaust treatment fluid includes supplying a urea exhaust treatment fluid.

In some embodiments, the method includes injecting the urea exhaust treatment fluid into an exhaust stream adjacent a selective-catalytic-reduction catalyst.

In some embodiments, the method includes controlling a plurality of injectors that receive the exhaust treatment fluid from the supply manifold based on the first fluid pressure in the supply manifold.

In some embodiments, the method includes injecting the exhaust treatment fluid into a single exhaust stream with the plurality of injectors.

In some embodiments, the method includes injecting the exhaust treatment fluid into a plurality of exhaust streams with the plurality of injectors. Each of the exhaust streams may correspond to one of a plurality of combustion engines.

In some embodiments, the method includes returning un-injected exhaust treatment fluid from the injector to the tank.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art.

Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
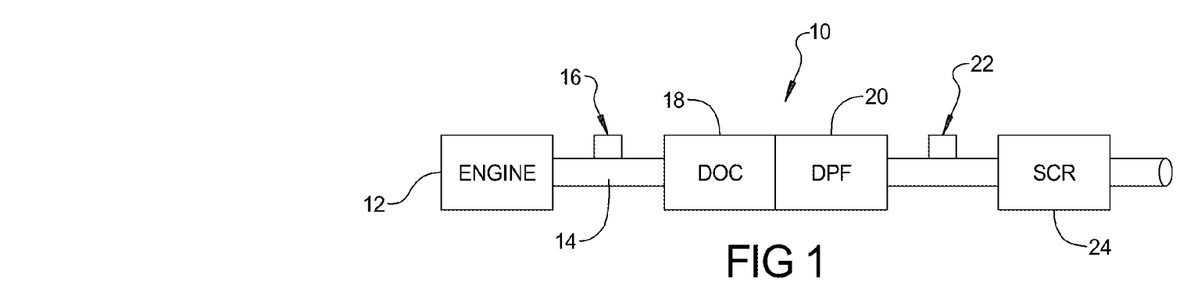
FIG. 1 is a schematic representation of an exhaust aftertreatment system according to the principles of the present disclosure.

FIG. 1 depicts an exhaust gas aftertreatment system 10 for treating the exhaust output from a combustion engine 12 in an exhaust passageway 14. The exhaust aftertreatment system 10 may include a first fluid delivery system 16, a diesel oxidation catalyst (DOC) 18, a diesel particulate filter (DPF) 20, a second fluid delivery system 22, and a selective-catalytic-reduction (SCR) catalyst 24. While FIG. 1 depicts a single engine 12 discharging exhaust gas into the exhaust passageway 14, in some embodiments, a plurality of combustion engines may discharge exhaust gas into the exhaust passageway 14 so that the exhaust aftertreatment system 10 may treat exhaust gas from all of those combustion engines. The plurality of combustion engines may operate concurrently and/or independently of each other.

The first fluid delivery system 16 may spray a hydrocarbon (e.g., diesel fuel) into the exhaust stream at or upstream of the DOC 18. The second fluid delivery system 22 may spray urea (or another reagent) into the exhaust stream at or upstream of the SCR catalyst 24. It will be appreciated that the specific components of the aftertreatment system 10 and the positioning of those components relative to the fluid delivery systems 16, 22 may vary from the configuration described above and shown in FIG. 1. It will be appreciated that the principles of the present disclosure are applicable to such variations.

Figure 2:
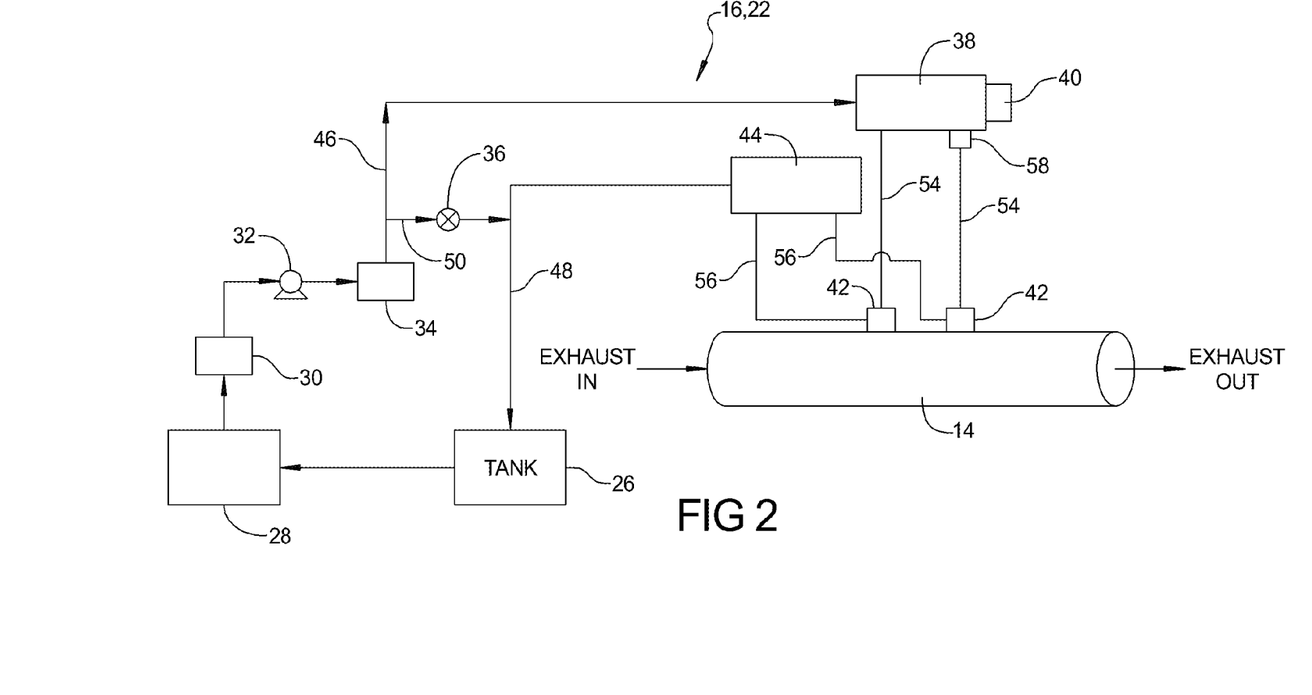
FIG. 2 is a schematic representation of a fluid delivery system of the exhaust aftertreatment system of FIG. 1.

FIG. 2 depicts an exemplary fluid delivery system. Either or both of the first fluid delivery systems 16, 22 may be configured as shown in FIG. 2. Therefore, the following description of the fluid delivery system shown in FIG. 2 may apply equally to the first and second fluid delivery systems 16, 22.

As shown in FIG. 2, the fluid delivery system 16, 22 may include a tank 26, a filter 28, a temperature sensor 30, a pump 32, a first pressure sensor 34, a bypass valve 36, one or more supply manifolds 38, a second pressure sensor 40, one or more injectors 42 and one or more return manifolds 44. The tank 26 may provide fluid to a supply passageway 46 and receive fluid from a return passageway 48. A bypass passageway 50 may directly fluidly connect the supply passageway 46 with the return passageway 48. While the fluid delivery system 16, 22 depicted in FIG. 2 includes two injectors 42, it will be appreciated that the fluid delivery system 16, 22 could include any number of injectors 42. Additionally or alternatively, the fluid delivery system 16, 22 could include one or more injectors 42 that inject fluid into separate exhaust gas passageways 14 that correspond to different ones of a plurality of engines. At any given time, some of such engines may be running while others may be shutdown, or all of the engines may be running concurrently or shutdown concurrently. Therefore, one or more of the injectors 42 may be shut down while one or more other injectors 42 may be injecting fluid into an exhaust stream.

The pump 32 may draw fluid stored in the tank 26 through the filter 28 and the temperature sensor 30. The temperature sensor 30 may detect a temperature of the fluid flowing therethrough and communicate the temperature data to a control module 52 (FIG. 3) continuously, intermittently or on demand. From the pump 32, the fluid may flow through the first pressure sensor 34 and into the supply passageway 46. The first pressure sensor 34 may detect a pressure of the fluid flowing therethrough and communicate the pressure data to the control module 52 continuously, intermittently or on demand. From the first pressure sensor 34, some or all of the fluid in the supply passageway 46 may flow into the supply manifold 38. The second pressure sensor 40 may detect a pressure of the fluid in the supply manifold 38 and communicate the pressure data to the control module 52 continuously, intermittently or on demand.

Figures 3, 4, 5:
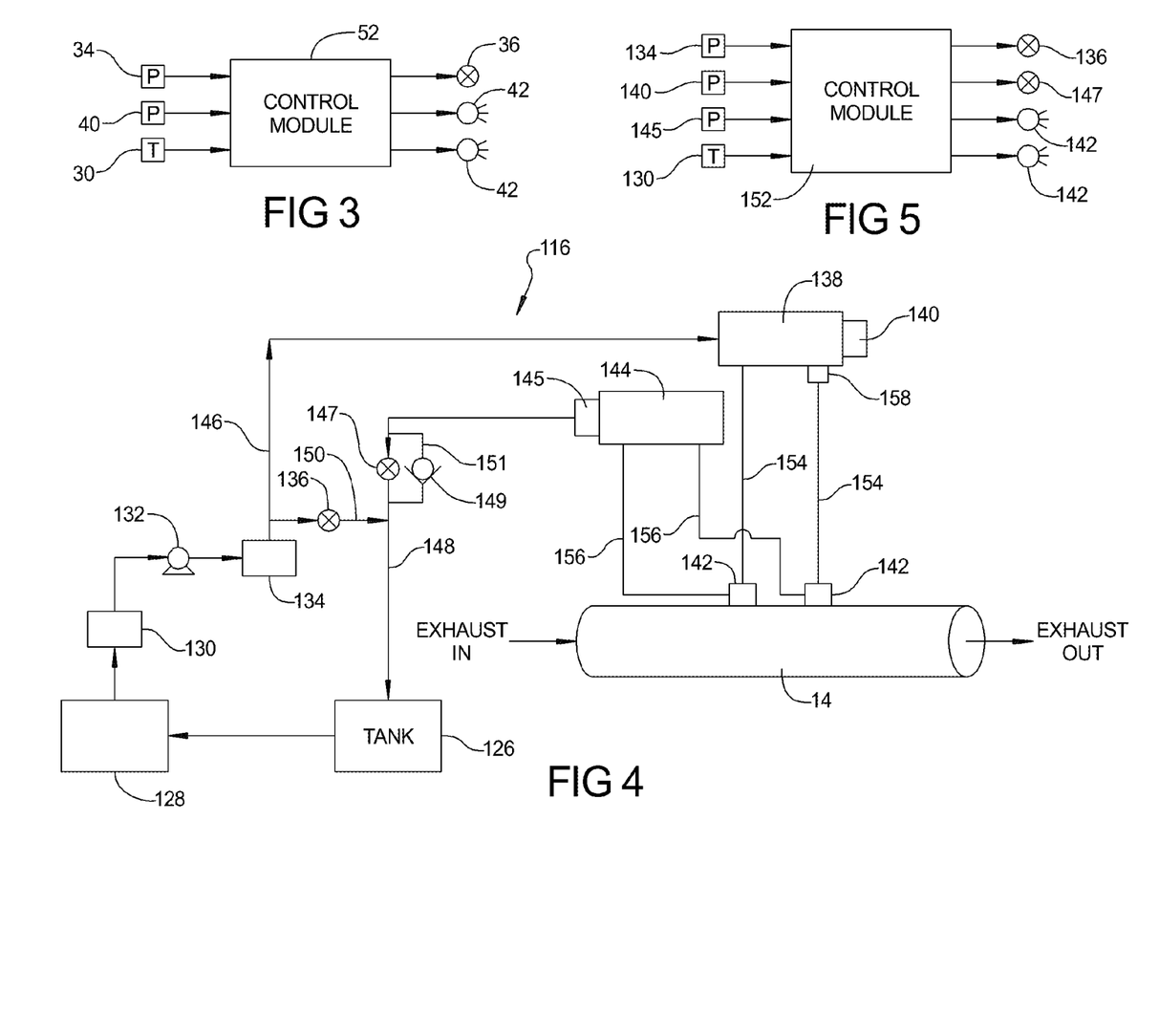
FIG. 3 is a schematic representation of a control module controlling a valve and injectors of the fluid delivery system of FIG. 2.
FIG. 4 is a schematic representation of another fluid delivery system according to the principles of the present disclosure.
FIG. 5 is a schematic representation of a control module controlling valves and injectors of the fluid delivery system of FIG. 4.

From the supply manifold 38, fluid may be supplied to the injectors 42 via supply lines 54. In some embodiments of the fluid delivery system 22, one or more urea quality sensor 58 may be disposed along one or more supply lines 54. The urea quality sensor 58 may sense the concentration of the urea (e.g., level of ammonia in the fluid) that is being supplied to the injectors 42. The urea quality sensor 58 may be in communication with the control module 52. The control module 52 may alter its control of the bypass valve 36, the injectors 42 and/or the pump 32 and/or shutdown the pump 32 based on data from the urea quality sensor 58.

A first portion of the fluid flowing through the supply lines 54 is injected into the exhaust stream flowing through exhaust passageway 14. Surplus fluid (un-injected fluid) at the injectors 42 flow to the return manifold 44 through return lines 56. The control module 52 may control operation of the injectors 42 to control the amount of fluid that is injected into the exhaust stream based on data from one or more of the temperature sensor 30, the first pressure sensor 34 and the second pressure sensor 40. In some embodiments, the injectors 42 may be pulse-width-modulated. From the return manifold 44, the fluid is returned to the tank 26 for storage therein and/or recirculation through the fluid delivery system 16, 22.

The control module 52 may control operation of the bypass valve 36 to selectively allow a portion of the fluid in the supply passageway 46 to flow directly to the return passageway 48 through the bypass passageway 50. In some embodiments, the bypass valve 36 may be pulse-width-modulated. The control module 52 may control operation of the bypass valve 36 based on data from one or more of the temperature sensor 30, the first pressure sensor 34 and the second pressure sensor 40.

As described above, the control module 52 is in communication with the first and second pressure sensors 34, 40, the temperature sensor 30, the bypass valve 36 and the injectors 42. The control module 52 may include or be part of an Application Specific Integrated Circuit (ASIC), an electronic circuit, a processor (shared, dedicated or group) and/or memory (shared, dedicated or group) that execute one or more software or firmware programs, and/or a combinational logic circuit, for example, and/or other suitable components that provide the described functionality. The control module 52 may be a part of or include a control unit controlling one or more other vehicle systems. Alternatively, the control module 52 may be a control unit dedicated to the exhaust aftertreatment system 10 or the fluid delivery system 16, 22. In some embodiments, the control module 52 may be in communication with and control operation of the pump 32. In some embodiments, the control module 52 may control the pump 32 (e.g., vary a speed or duty cycle of the pump 32) to achieve desired flow rates and/or fluid pressures based on data received from one or more of the sensors 30, 34, 40.

Based on data received from the first pressure sensor 34, the control module 52 may control the bypass valve 36 to achieve a first predetermined fluid pressure in the supply passageway 46. The first predetermined fluid pressure may be a pressure that is above a desired target fluid pressure at one or more of the injectors 42. The first predetermined fluid pressure and/or the target pressure at the injectors may be constant values or values that change based on operating conditions of the one or more engines 12 (e.g., engine speed, engine load, engine temperature, exhaust gas temperature, exhaust gas flow rate) and/or temperature data from the temperature sensor 30, for example.

The control module 52 may adjust the pulse-width-modulation (PWM) duty cycle to achieve the first predetermined fluid pressure in the supply passageway 46. That is, when fluid pressure in the supply passageway 46 (i.e., at the first pressure sensor 34) is higher than the first predetermined fluid pressure, the control module 52 may adjust the PWM duty cycle to allow more fluid from the supply passageway 46 to flow through the bypass passageway 50 to the return passageway 48 (which leads back to the tank 26). When fluid pressure in the supply passageway 46 (i.e., at the first pressure sensor 34) is lower than the first predetermined fluid pressure, the control module 52 may adjust the PWM duty cycle to restrict fluid flow through the supply passageway 46, thereby providing more fluid to the supply manifold 38.

Based on data received from the second pressure sensor 40, the control module 52 may control the PWM duty cycle of the injectors 42 to achieve a desired target pressure in the supply lines 54 proximate the injectors 42. That is, when fluid pressure at the second pressure sensor 40 is lower than a second predetermined fluid pressure, the control module 52 may adjust the PWM duty cycle of the injectors 42 to reduce the amount of fluid injected into the exhaust stream 14. When fluid pressure at the second pressure sensor 40 is higher than the second predetermined fluid pressure, the control module 52 may adjust the PWM duty cycle of the injectors 42 to increase the amount of fluid injected into the exhaust stream 14. The second predetermined fluid pressure may be a constant value or a value that changes based on operating conditions of the one or more engines 12 (e.g., engine speed, engine load, engine temperature, exhaust gas temperature, exhaust gas flow rate) and/or temperature data from the temperature sensor 30, for example.

It will be appreciated that at any given time, it may be desirable for one or more of the injectors 42 to be injecting fluid into the exhaust stream 14, while another or more of the injectors 42 are shutdown (i.e., injecting no fluid into the exhaust stream 14). In controlling the PWM duty cycle of the bypass valve 36 and/or one or more of the injectors 42, the control module 52 may account for whether or not one or more of the injectors 42 are shutdown at any given time and adjust the duty cycles of the operating injectors 42 accordingly. In some embodiments, one or more injectors 42 may operate under a different PWM duty cycle than one or more other injectors 42. In some embodiments, one or more of the injectors 42 may have a different orifice size than one or more other injectors 42 for injecting different amounts of fluid at the same or different pressures.

With reference to FIGS. 4 and 5, another fluid delivery system 116 is provided. The fluid delivery system 116 may be incorporated into the exhaust aftertreatment system 10 instead of either of the fluid delivery systems 16, 22. The structure and function of the fluid delivery system 116 may be similar or identical to that of the fluid delivery system 16, 22 described above, apart from any exceptions described below and/or shown in the figures. Therefore, similar features will not be described again in detail.

The fluid delivery system 116 may include a tank 126, a filter 128, a temperature sensor 130, a pump 132, a first pressure sensor 134 (disposed in a supply passageway 146), a bypass valve 136 (disposed in a bypass passageway 150), one or more supply manifolds 138, a second pressure sensor 140, one or more supply lines 154, one or more injectors 142, one or more return lines 156, one or more return manifolds 144, a third pressure sensor 145, a return valve 147 (disposed in a return passageway 148), and a check valve 149 (disposed in a valve-bypass line 151). A control module 152 may be in communication with the first, second and third pressure sensors 134, 140, 145 the temperature sensor 130, the bypass valve 136, the injectors 142 and the return valve 147. The control module 152 may control operation of the bypass valve 136, the injectors 142 and the return valve 147 based on data received from one or more of the sensors 130, 134, 140, 145. The structure and function of the control module 152, sensors 130, 134, 140, bypass valve 136 and injectors 142 may be similar or identical to that of the control module 52, sensors 30, 34, 40, bypass valve 36 and injectors 42 described above, apart from any exceptions described below. Therefore, similar features will not be described again in detail.

In some embodiments, one or more of the supply lines 154 may include a urea quality sensor 158. The structure and function of the urea quality sensor 158 may be similar or identical to that of the urea quality sensor 58 described above.

The third pressure sensor 145 may detect a pressure of fluid in the return passageway 148 and communicate that data to the control module 152 continuously, intermittently or on demand. Based on data from the third pressure sensor 145, the control module 152 may adjust the PWM duty cycle of the return valve 147 to achieve a third predetermined fluid pressure in the return passageway 148. That is, when fluid pressure in the return passageway 148 (i.e., at the third pressure sensor 145) is higher than the third predetermined fluid pressure, the control module 152 may adjust the PWM duty cycle to allow more fluid through the return passageway 148. When fluid pressure in the return passageway 148 (i.e., at the third pressure sensor 145) is lower than the third predetermined fluid pressure, the control module 152 may adjust the PWM duty cycle of the return valve 147 to restrict fluid flow therethrough. Controlling the return valve 147 in this manner acts to tune backpressure at the injectors 142 and tune an amount of heat transfer from the injectors 142 to the un-injected fluid. The third predetermined fluid pressure may be a constant value or a value that changes based on operating conditions of the one or more engines 12 (e.g., engine speed, engine load, engine temperature, exhaust gas temperature, exhaust gas flow rate) and/or temperature data from the temperature sensor 130, for example.

The valve-bypass line 151 is connected to the return passageway 148 and allows fluid to bypass the return valve 147 when the valves 136, 147 and the injectors are off (closed). The check valve 149 may allow fluid in the return passageway 148 between the tank 126 and the return valve 147 to flow through the valve-bypass line 151 to a location on the return passageway 148 between the return valve 147 and the return manifold 144. The check valve 149 may prevent fluid flow through the valve-bypass line 151 in the opposite direction. In this manner, during normal operation of the aftertreatment system 10 (in which one or more of the injectors 142 are operating), the check valve 149 prevents fluid from bypassing the return valve 147. The check valve 149 and valve-bypass line 151 allow the fluid delivery system 116 to be reverse-purged (e.g., by pumping fluid from the tank 126 or air with an auxiliary pump (not shown) toward the return manifold 144 through the return passageway 148) to clean the fluid delivery system 116, check for leaks in the fluid delivery system 116, and/or to purge liquid from one or more components or conduits of the fluid delivery system 116 to prevent liquid from freezing therein.

While the valves 36, 136, 147 and injectors 42, 142 are described above as being pulse-width modulated, it will be appreciated that in some embodiments, some or all of the valves 36, 136, 147 and/or injectors 42, 142 may not be pulse-width modulated. Rather, some or all of the valves 36, 136, 147 and/or injectors 42, 142 may be controlled by varying valve positions between fully open and fully closed positions.

While not shown in the figures, in some embodiments, the fluid delivery system 16, 22, 116 may include an additional bypass valve (e.g., a PWM bypass valve) selectively allowing fluid at the supply manifold 38, 138 or between the supply manifold 38, 138 and the injectors 42, 142 to bypass the injectors 42, 142 and flow directly to the return passageway 48, 148. For example, such a valve may be advantageously incorporated into a system with a large number of injectors (e.g., 8 or more) being fed by the same supply manifold.

While the systems 16, 22, 116 are shown in the figures as having a single bypass valve 36, 136 and a single bypass passageway 50, 150, in some embodiments, the systems 16, 22, 116 may include multiple bypass valves 36, 136 and/or multiple bypass passageways 50, 150.

Furthermore, while the systems 16, 22, 116 are described above as having return passageways 48, 148 that receive un-injected fluid from the injectors 42, 142, in some embodiments, the injectors 42, 142 may inject all of the fluid supplied to them. That is, the injectors 42, 142 may not be equipped to receive reagent fluid for cooling and returning to the tank 26, 126. In such embodiments, the systems 16, 22, 116 may not include return lines 56, 156 fluidly coupling the injectors 42, 142 with return manifolds 44, 144 and the tank 26, 126. In some embodiments, the injectors 42, 142 can include cooling jackets that receive a coolant fluid (e.g., a fluid other than urea or hydrocarbon fluid).

It will be appreciated that the supply manifold 38, 138 and the return manifold 44, 144 could be formed from a common manifold block, or the supply manifold 38, 138 and the return manifold 44, 144 could be discrete and separate components.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust aftertreatment system for treating exhaust gas discharged from a combustion engine, the exhaust aftertreatment system comprising:
   a catalyst component; and
   an exhaust treatment fluid delivery system for injecting an exhaust treatment fluid into an exhaust stream at a location upstream of the catalyst component, the exhaust treatment fluid delivery system including:
   a tank for holding the exhaust treatment fluid;
   a supply passageway receiving the exhaust treatment fluid from the tank and providing the exhaust treatment fluid to a supply manifold;
   a plurality of injectors that receive the exhaust treatment fluid from the supply manifold and dose the exhaust treatment fluid into the exhaust stream;
   a return passageway through which exhaust treatment fluid from the injectors is returned to the tank;
   a bypass passageway connecting the supply passageway with the return passageway and including a bypass valve controlling fluid flow therebetween, the bypass valve selectively allowing a portion of the exhaust treatment fluid in the supply passageway to return to the tank via the bypass passageway without flowing through the injectors; and
   a control module controlling the bypass valve and the injectors based on a first fluid pressure in the supply passageway and a second fluid pressure between the supply manifold and the injectors.

2. The exhaust aftertreatment system of claim 1, wherein the control module controls the bypass valve to achieve a predetermined fluid pressure in the supply passageway that is higher than a target fluid pressure at the injectors.

3. The exhaust aftertreatment system of claim 1, wherein the exhaust treatment fluid is a hydrocarbon exhaust treatment fluid, the hydrocarbon exhaust treatment fluid being dispersed at a location adjacent the catalyst component.

4. The exhaust aftertreatment system of claim 1, wherein the exhaust treatment fluid is a urea exhaust treatment fluid, the urea exhaust treatment fluid being dispersed at a location adjacent the catalyst component.

5. The exhaust aftertreatment system of claim 4, wherein the catalyst component is a selective-catalytic-reduction catalyst.

6. The exhaust aftertreatment system of claim 4, further comprising a urea quality sensor disposed upstream of at least one of the injectors.

7. The exhaust aftertreatment system of claim 1, wherein the plurality of injectors inject the exhaust treatment fluid into a common exhaust stream.

8. An exhaust aftertreatment system for treating exhaust gas discharged from a combustion engine, the exhaust aftertreatment system comprising:
   a catalyst component; and
   an exhaust treatment fluid delivery system for injecting an exhaust treatment fluid into an exhaust stream at a location upstream of the catalyst component, the exhaust treatment fluid delivery system including:
   a tank for holding the exhaust treatment fluid;
   a supply passageway receiving the exhaust treatment fluid from the tank and providing the exhaust treatment fluid to a supply manifold;
   a plurality of injectors that receive the exhaust treatment fluid from the supply manifold and dose the exhaust treatment fluid into the exhaust stream;
   a bypass valve selectively allowing a portion of the exhaust treatment fluid in the supply passageway to return to the tank via a bypass passageway without flowing through the injectors; and
   a control module controlling the bypass valve and the injectors based on a first fluid pressure in the supply passageway and a second fluid pressure between the supply manifold and the injectors, wherein the plurality of injectors inject the exhaust treatment fluid into separate exhaust streams corresponding to multiple combustion engines.

9. A fluid delivery system for injecting exhaust treatment fluid into a stream of exhaust gas discharged by a combustion engine, the fluid delivery system comprising:
   a tank for containing the exhaust treatment fluid;
   a supply passageway receiving the exhaust treatment fluid from the tank;
   a supply manifold receiving the exhaust treatment fluid from the supply passageway;
   a plurality of injectors receiving the exhaust treatment fluid from the supply manifold;
   a return passageway through which exhaust treatment fluid from the injectors is returned to the tank;
   a bypass passageway connecting the supply passageway with the return passageway and including a bypass valve controlling fluid flow therebetween;
   a first pressure sensor measuring a first pressure of exhaust treatment fluid in the supply passageway based upon which the bypass valve is controlled; and
   a second pressure sensor measuring a second pressure of exhaust treatment fluid downstream of the supply passageway based upon which the injectors are controlled.

10. The fluid delivery system of claim 9, wherein the bypass passageway includes a check valve that allows fluid flow through the bypass passageway in a first direction from a first location between a return valve and the tank and a second location between the return valve and a return manifold and prevents fluid flow through the valve-bypass line in a second direction opposite the first direction.

11. The fluid delivery system of claim 9, wherein the plurality of injectors inject the exhaust treatment fluid into a common exhaust stream.

12. The fluid delivery system of claim 9, wherein the plurality of injectors inject the exhaust treatment fluid into separate exhaust streams corresponding to multiple combustion engines.

13. A method comprising:
   supplying exhaust treatment fluid from a tank to a supply manifold;
   controlling an injector that receives the exhaust treatment fluid from the supply manifold based on a first fluid pressure in the supply manifold;
   providing a return passageway through which exhaust treatment fluid from the injector is returned to the tank;
   providing a bypass passageway connecting the supply manifold with the return passageway and including a bypass valve controlling fluid flow therebetween;
   selectively allowing a portion of the exhaust treatment fluid to bypass the injector; and
   controlling an amount of the exhaust treatment fluid that is allowed to bypass the injector based on a second fluid pressure upstream of the supply manifold.

14. The method of claim 13, wherein controlling the injector includes adjusting a pulse-width-modulation duty cycle of the injector.

15. The method of claim 13, wherein controlling the amount of the exhaust treatment fluid that is allowed to bypass the injector includes adjusting a pulse-width-modulation duty cycle of a bypass valve.

16. The method of claim 13, further comprising controlling a backpressure of fluid at the injector with a return valve disposed in the return passageway through which exhaust treatment fluid is returned from the injector to the tank.

17. The method of claim 16, wherein controlling the backpressure of fluid at the injector with the return valve includes controlling the return valve based on a third fluid pressure in the return passageway, wherein controlling the return valve includes adjusting a pulse-width-modulation duty cycle of the return valve.

18. The method of claim 17, further comprising selectively allowing exhaust treatment fluid to bypass the return valve.

19. A method comprising:
supplying exhaust treatment fluid from a tank to a supply manifold;
controlling an injector that receives the exhaust treatment fluid from the supply manifold based on a first fluid pressure in the supply manifold;
selectively allowing a portion of the exhaust treatment fluid to bypass the injector;
controlling an amount of the exhaust treatment fluid that is allowed to bypass the injector based on a second fluid pressure upstream of the supply manifold,
controlling a backpressure of fluid at the injector with a return valve disposed in a return passageway through which exhaust treatment fluid is returned from the injector to the tank; and
detecting fluid leaks by pumping fluid through the return passageway toward a return manifold.

20. The method of claim 13, further comprising controlling a plurality of injectors that receive the exhaust treatment fluid from the supply manifold based on the first fluid pressure in the supply manifold.

* * * * *